(12) United States Patent
Binding et al.

(10) Patent No.: US 7,134,024 B1
(45) Date of Patent: Nov. 7, 2006

(54) METHOD OF ESTABLISHING THE TRUSTWORTHINESS LEVEL OF A PARTICIPANT IN A COMMUNICATION CONNECTION

(75) Inventors: Carl Binding, Thalwil (CH); Stefan Hild, Adliswil (CH); Michael Moser, Zurich (CH); Luke O'Connor, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/743,844

(22) PCT Filed: Nov. 23, 1998

(86) PCT No.: PCT/IB98/01854

§ 371 (c)(1),
(2), (4) Date: Aug. 9, 2001

(87) PCT Pub. No.: WO00/04673

PCT Pub. Date: Jan. 27, 2000

(30) Foreign Application Priority Data

Jul. 15, 1998 (EP) .................................. 98113121

(51) Int. Cl.
*G06F 11/30* (2006.01)
(52) U.S. Cl. ....................................... 713/187; 713/165
(58) Field of Classification Search ................. 713/182, 713/200, 201, 165
See application file for complete search history.

(56) References Cited

U.S. PATENT DOCUMENTS 5,373,561 A * 12/1994 Haber et al. ................. 713/157
5,799,086 A * 8/1998 Sudia ............................ 705/76

FOREIGN PATENT DOCUMENTS

JP   PUPA 02-291043   11/1990
JP   PUPA 07-193569   7/1995

* cited by examiner

*Primary Examiner*—Thomas R. Peeso
(74) *Attorney, Agent, or Firm*—Ference & Associates

(57) ABSTRACT

A method of establishing a trustworthiness level of a participant in a communication connection between a first communication partner and a second communication partner is proposed whereby the communication behavior is adapted to the established trustworthiness level. The participant is equipped with a trustworthiness certificate and a therefrom separated securely stored participant private key. The first communication partner receives the trustworthiness certificate from the participant wherefrom the trustworthiness level is derived and established. The first communication partner tests whether the trustworthiness certificate belongs to the participant by using the participant private key. In case the trustworthiness certificate is confirmed by the test to belong to the participant, the first communication partner communicates the established trustworthiness level to the second communication partner. Then, at least one parameter of the communication behavior is chosen in dependence of the established trustworthiness level.

9 Claims, 1 Drawing Sheet

METHOD OF ESTABLISHING THE TRUSTWORTHINESS LEVEL OF A PARTICIPANT IN A COMMUNICATION CONNECTION

The invention relates to a method for establishing a trustworthiness level of a participant in a communication connection between a first communication partner and a second communication partner. More particularly it relates to a method for establishing the trustworthiness level of a handheld device, such as a handheld telephone in a trusted environment, e.g. comprising a smartcard and a back-end server.

TECHNICAL FIELD AND BACKGROUND OF THE INVENTION

Integrated-circuit cards, also known as smartcards, are generally believed to offer more tamper resistance than conventional computer systems, and are thus frequently used for authentication and security functions within large computer systems. As an example, the use of a smartcard as the Subscriber Identification Module, short SIM, within the GSM mobile-telephony system is considered. Here, the mobile handset, also called mobile equipment or ME, is not normally considered as a trusted device and a trusted smartcard is used to securely store and process subscriber information and authentication functions. When placing a call, the mobile network authenticates the mobile user by exercising authentication functions contained in the trusted smartcard.

Handheld phones are currently being extended to allow user programs to be executed on the handheld phone for value-add applications such as banking and payment. Access to the smartcard of the handheld phone is provided for the relevant security functions required for a value-add application, such as the initial authentication for a financial transaction originating from the handset. While it is possible to have the smartcard perform all critical security functions, this is unlikely since the smartcard has limited processing- and storage capacity. It is thus anticipated that security functions for complex applications like banking will not be executed solely on the smartcard, and at least partial trust must be delegated to the handheld phone. Apart from issues of processing and storage, the smartcard must implicitly trust the handheld phone to provide a reliable communication channel to and from the smartcard.

Henceforth, it is anticipated that portions of complex applications will be executed on the handheld phone. Since the handheld phone also conveys all communications between the smartcard, the user, and the back-end server, a malicious handheld phone could conceivably alter the contents of the data packets sent between the three parties. Relying on the trusted smartcard to sign or authenticate messages does not alleviate this threat since the smartcard cannot verify that a message presented to it by the handheld phone for signature or authentication is in fact the message presented by the handheld phone to the user.

It is therefore necessary for applications that demand high levels of security and secrecy to extend the sphere of trust to include the handheld phone itself. Conventionally, this is achieved through two primary means, tamper-resistant hardware and ensuring that such tamper-resistant devices are being used through either policy or by authentication from the back-end server.

U.S. Pat. No. 5,371,794 discloses a method and apparatus for privacy and authentication in wireless networks. The method and apparatus is for providing a secure wireless communication link between a mobile nomadic device and a base computing unit. A mobile sends a host certificate (Cert_Mobile) to the base along with a randomly chosen challenge value (CH1) and a list of supported shared key algorithms ("SKCS"). The base determines if the Cert_Mobile is valid. If the Cert_Mobile is not valid, then the base unit rejects the connection attempt. The base then sends a Cert_Base, random number (RN1) encrypted in mobile's public key and an identifier for the chosen SKCS to the mobile. The base saves the RN1 value and adds the CH1 value and the chosen SKCS to messages sent to the base. The mobile unit then validates the Cert_Base, and if the certificate is valid, the mobile verifies under the public key of the base (Pub_Base) the signature on the message. The signature is verified by taking the base message and appending it to CH1 and the list of shared key algorithms that the mobile provided in the first message. If the base signature is not valid, then the communication attempt is aborted. In the event that the base signature is valid, the mobile determines the value of RN1 by decrypting Pub_Mobile, RN1 under the private key of the mobile. The mobile then generates RN2 and the session key, and encrypts RN2 under the Pub_Base. The mobile sends the encrypted RN2 and E(Pub_Mobile, RN1) to the base. The base then verifies the mobile signature using the Pub—Mobile obtained from the Cert_Mobile. If the mobile signature is verified, the base decrypts E(Pub_Base, RN2) using its private key. The base then determines the session key. The mobile and base may then enter a data transfer phase using encrypted data which is decrypted using the session key which is RN1⊕RN2.

The European patent application 0 589 022 A1 discloses a public key cryptographic system with enhanced digital signature certification which authenticates the identity of the public key holder. A hierarchy of nested certifications and signatures are employed which indicate the authority and responsibility levels of the individual whose signature is being certified. The certifier in constructing a certificate generates a special message that includes fields identifying the public key which is being certified, and the name of the certifee. The certificate is constructed by the certifier to define the authority which is being granted and which may relate to wide range of authorizations, delegation responsibilities or restrictions given to, or placed on the certifee.

Designing special tamper-resistant hardware may involve special ruggedized designs with circuitry that erases security-sensitive information such as cryptographic parameters and aborts pending transactions if a device is physically tampered with, such as when the case is opened, or the power is cut, or designing hardwired circuits that do not have any software-controlled components on the paths between the trusted smartcard and the required input/output devices.

Unfortunately, mobile equipment such as mobile handsets are not currently designed to be tamperproof and adding full tamper-resistance is not realistic for commodity-style handsets due to the expected cost of doing so.

OBJECT AND ADVANTAGES OF THE INVENTION

It is an object of the invention according to claim 1 or 9 to provide a method for establishing the trustworthiness level of a participant in a communication connection in order to adapt the communication behavior to this trustworthiness level. Since the world of participants in communication is split up into tamperproof devices which can be trusted and devices which are better not trusted for security-sensitive communication, the invention provides an advantageous solution for communicating between two partners over a participant by establishing its trustworthiness level and adapting the communication behavior to the established trustworthiness level. With this method, trusted and non-trusted devices can participate in the communication and the trustworthiness of each participating device is checked automatically before communicating security-sensitive information.

The participant can e.g. be a mobile equipment such as a handheld phone. The trustworthiness level of the handheld phone indicates the degree of inherent tamper resistance. The first communication partner can be for instance a smartcard and the second communication partner a back-end server.

The smartcard can use the handheld phone to connect to a back-end server, and the smart-card and the back-end server are in an advantageous manner able to establish an authenticated session, assuming an untrusted handheld phone. After establishing the trustworthiness level, the smartcard communicates the trustworthiness level of the handheld phone to the back-end server without the back-end server directly authenticating the handheld phone.

It is another object to provide a method where a trustworthiness policy is specified for an application, which policy restricts the functionality of the application based on the trustworthiness level of the handheld phone.

When the trustworthiness certificate arrives at the first communication partner signed with a signature, produced with a certificate authority private key, and the first communication partner authenticates the signature using a certificate authority public key, a secure method is used to check whether the signature has been issued by a competent and to-be-trusted certificate authority. This is advantageous because it then can easily be confirmed that the information contained in the corresponding participant certificate is as issued by its originator.

The certificate authority public key can be read from a storage of the first communication partner, which has the advantage that this key is already available and need not be acquired form somewhere else. This also saves time.

Communicating the detected trustworthiness level can occur by piggybacking and signing necessary information onto application level messages between the smartcard and the back-end, application server. When the first communication partner communicates the established trustworthiness level to the second communication partner by piggy-backing a trustworthiness level information onto a communication message, signing the communication message with a first-partner private key and sending it to the second communication partner, again a very secure way of informing the back-end server about the established trustworthiness level is chosen. Hence, a malicious participant can not amend this information and thereby pretend to be a trustable participant.

As one of the parameters of the communication behavior which is chosen in dependence of the established trustworthiness level, can be chosen the amount or number of a valuable asset, e.g. a maximum number of financial transactions and/or a maximum financial value of a financial transaction and/or a maximum number of confidential words. This adapted behavior can be used to compensate for eventual lack of security which has been established in form of a low trustworthiness level. For instance, in case of a low trustworthiness level, only financial transactions up to a fixed amount of money can be executed.

The test whether the trustworthiness certificate belongs to the participant can be performed in that a test number is transmitted by the first communication partner to the participant from where the test number returns signed under use of the participant private key. The signature of the returning test number is verified by using a participant public key which corresponds to the participant private key. This challenge-response principle provides a simple method which is easy to implement and provides a high level of security.

The participant public key can be received by the first communication partner as content of the trustworthiness certificate. This method provides for the possibility of multiple trustworthiness certificates and hence also multiple trustworthiness levels, if each certificate is assigned a different trustworthiness level.

When the trustworthiness level is established in that for each trustworthiness level a different trustworthiness certificate with a corresponding pair of participant public key and participant private key is used, a very simple and straightforward scheme for realizing different levels is provided. It can be used in that e.g. for different key lengths or just different signing authorities, different trustworthiness levels can be assigned.

The handheld phone is providing communication- and processing resources for the smart-card and the back-end server to execute an application. The back-end server wishes to authenticate the handheld phone since security-sensitive data may be sent to the smartcard via the handheld phone. As the handheld phone and the back-end server may be separated by a substantial physical distance and/or connected by a low-bandwidth network, running a traditional authentication protocol between the handheld phone and the back-end server may be costly. It is hence more efficient to make use of the smartcard to authenticate the trustworthiness level of the handheld phone locally where communication between the smartcard and handheld phone is relatively fast and cheap.

The proposed solution is most advantageous to the deployment of banking services based on mobile handsets, for example GSM telephones, since such applications demand high levels of security. As pointed out above, this in turn requires some trustworthiness level to be extended to the handset itself. Not all handsets will be trusted, due to the cost of designing and manufacturing such handsets and due to the large number of handsets which are already in-the-field that do not include any tamper-resistance.

The smartcard acts as a sort of delegate or proxy for the back-end server which establishes the trustworthiness level locally with respect to the handheld-phone/smartcard environment. The system described herein allows the trusted smartcard to detect the level of tamper-resistance of the handheld phone and communicate that level to the back-end server. An inherent advantage of the proposed solution compared to server-based device authentication methods lies in the reduced communications requirement between the back-end server and the handheld phone which lowers communications cost on one side and allows the process to be executed repeatedly if necessary, e.g., prior to each message between the smartcard and the back end server, offering additional protection.

Adapting the application behavior to the communicated trustworthiness level can be implemented by limiting the number of transactions or establishing a maximum financial value of the executed transactions. For example, from completely untrusted handsets only account inquiries might be allowed, whereas completely trusted handsets can be used to execute arbitrarily large value transactions. Handsets that offer intermediate levels of trustworthiness might be limited to transactions up to a certain value per month.

SUMMARY OF THE INVENTION

A method is proposed whereby a trustworthiness level is assigned to a handheld phone, that reflects the level of tamper-resistance that the handheld phone offers. Current mobile handsets, for example, offer no tamper-resistance and would be assigned the lowest trustworthiness level. Future fully tamperproof handsets would be assigned the highest trustworthiness level. Intermediate trustworthiness levels would designate for which incomplete but not insignificant measures against tampering have been made.

The first communication partner, e.g. a smartcard, has means of verifying the level of tamper-resistance of the handheld phone which is a participant in the communication connection between the first communication partner and a second communication partner and further has means to securely communicate the detected level of tamper-resistance in the handheld phone to the second communication partner, e.g. a back-end server with whom the smartcard is communicating during the execution of an application on the participant.

The back-end server is then able to adapt the behavior of the communication, respectively application according to the level of tamper-resistance detected and communicated to it by the smartcard.

The basic steps of the method can be described as follows:

When the smartcard is inserted into the handheld phone to initiate a session, the smartcard requests the trustworthiness level from the handheld phone. The trustworthiness level may be assigned for example by the manufacturer of the handheld phone or perhaps by the institution with which applications on the handheld phone will communicate with or on behalf of, such as a bank or credit card company.

The smartcard verifies that the trustworthiness level received from the handheld phone is valid in the sense that the token was produced by an entity with the authority to assign trustworthiness levels and also that the trustworthiness level is not being replayed. If the trustworthiness level fails verification then the handheld phone is considered untrusted. If this is the case, the smartcard may choose to terminate the session, or continue the session with the restriction that only applications requiring an untrusted handheld phone can be executed. The smartcard then forms a trustworthiness level token TLT which the smartcard will use to forward to third parties to demonstrate the trustworthiness level of the handheld phone.

An application on the handheld phone is selected for execution, where the application uses the network to contact a back-end server. The back-end server and the smartcard are authenticated to each other using a protocol that does not depend on the trustworthiness of the handheld phone. For example, if the handheld phone is a GSM handset and the smartcard is a SIM, then the back-end server and the smartcard SIM are authenticated using the standard GSM authentication functions. Alternatively the authentication functions of WTLS can be used.

The smartcard communicates the trustworthiness level of the handheld phone to the back-end server by appending the trustworthiness level token TLT to the application packets of the application that are sent from the smartcard to the back-end server S. The trustworthiness level token TLT may be appended to each packet or according to another strategy depending on some policy.

Once the back-end server has received the trustworthiness level token TLT of the handheld phone via the smartcard, it need not verify the trustworthiness level of the handheld phone with the handheld phone itself, as this has been done by the trusted smartcard. The back-end server consults a trustworthiness policy which describes what restrictions are placed on application relative to the trustworthiness level designated by trustworthiness level token TLT. The back-end server adjusts it actions and responses in application accordingly.

DESCRIPTION OF THE DRAWINGS

An examples of the invention is depicted in the drawing and described in detail below by way of example. It is shown in FIG. 1 a system with a first communication partner, a participant and a second communication partner.

The FIGURE is for sake of clarity not shown in real dimensions, nor are the relations between the dimensions shown in a realistic scale.

DETAILED DESCRIPTION OF THE INVENTION

Figure 1:
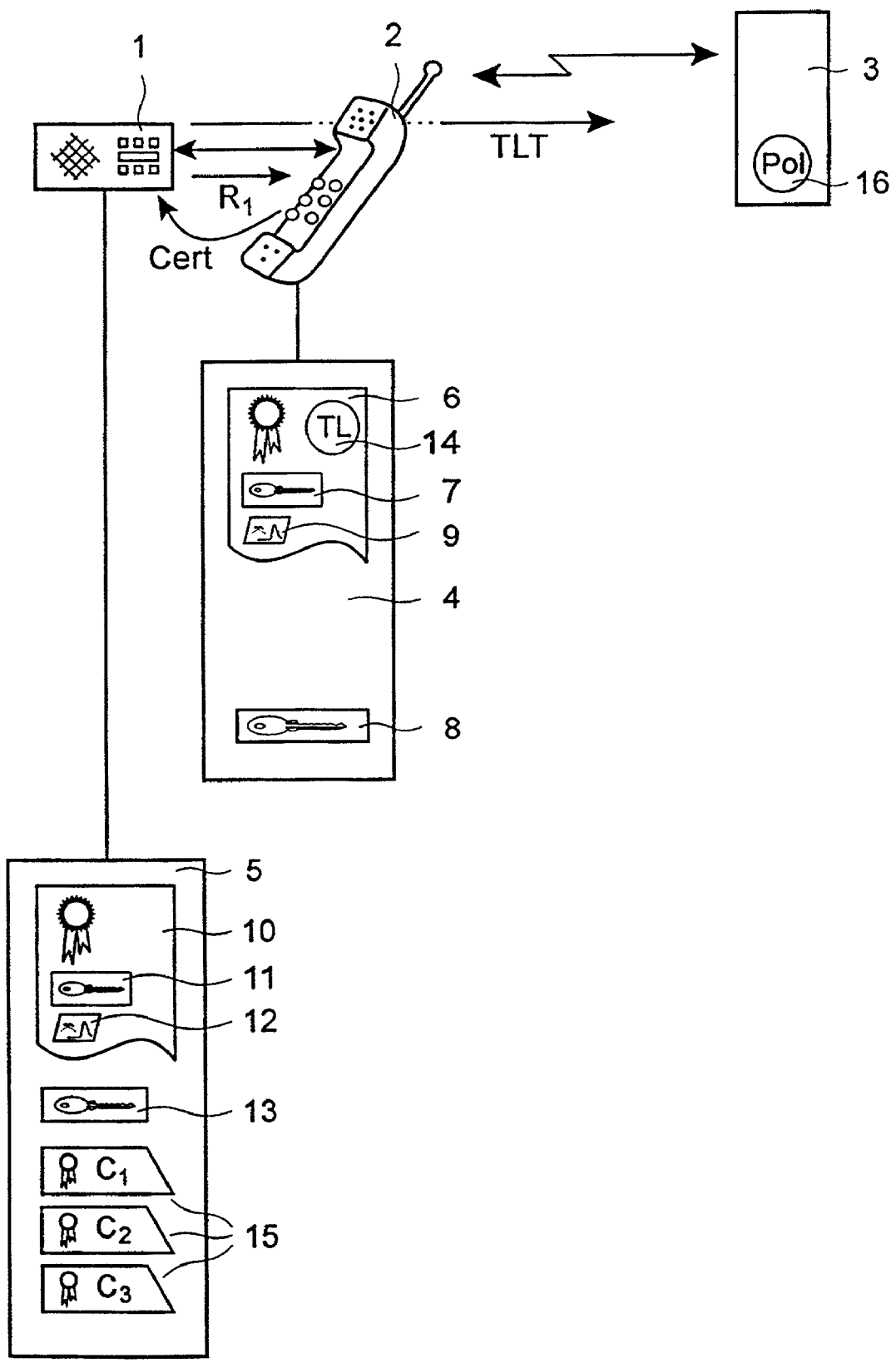

In the following, the various exemplary embodiments of the invention are described.

In FIG. 1, a system comprising a first communication partner 1 in form of a smartcard, a second communication partner in form of a back-end server 3 and a participant 2 in a communication connection between the communication partners 1, 3 in form of a handheld phone is depicted. The handheld phone 2 comprises a memory unit 4, also called phone trustworthiness module, in which a trustworthiness certificate 6 is stored.

When the smartcard 1 is inserted into the handheld phone 2 to initiate a session via the communication connection, the smartcard 1 requests the transmission of the trustworthiness certificate 6 from the handheld phone 2.

The following realization is based on the use of the principle of public key cryptography, which enables an entity to produce a digital signature and other entities to verify the signature. Other authentication methods however apply as well.

It is assumed that the valid set of trustworthiness levels TL is represented by a list of L+1 integers $0, 1, \ldots, L$, such that 0 designates no trustworthiness, 1 designates minimum trustworthiness and L designates maximum trustworthiness. The values between 0 and L represent intermediate trustworthiness levels TL, where a higher value implies higher trustworthiness.

At the time of production or personalization, the phone trustworthiness module 4 was loaded with the trustworthiness certificate 6 $Cert^{ME}_{CA}$, for example in X509 format or in WTLS format. The trustworthiness certificate 6 $Cert^{ME}_{CA}$ represents a binding between the name of the handheld phone 2, and a participant public key 7 $K_{ME}$, which binding is described in the trustworthiness certificate 6 $Cert^{ME}_{CA}$. The trustworthiness certificate 6 $Cert^{ME}_{CA}$ also contains an extension field 14 containing an integer which gives the trustworthiness level TL assigned to the handheld phone 2, where $0<=TL<=L$. The trustworthiness certificate 6 bears trustworthiness certificate signature 9 from a certificate authority CA, which therefor used its certificate authority private key.

A participant private key 8 $K^{-1}_{ME}$ associated with the participant public key 7 $K_{ME}$ of the trustworthiness certificate 6 and functions that operate using that participant private key $K^{-1}{}_{ME}$ are also loaded into the phone trustworthiness module 4 of the handheld phone 2, which module 4 is a secure and tamperproof processing area. Such an area should be used in all handheld phones with a trustworthiness level TL greater than 0. At least the participant private key 8 $K^{-1}{}_{ME}$ need be securely stored, i.e. such that it can not be read by a non-allowed person or device.

Thus, the handheld phone 2 has assigned a participant public/private key pair 7, 8 $K_{ME}/K^{-1}{}_{ME}$ which can be used for verifying the affiliation or belonging of the trustworthiness certificate 6 to the handheld phone 2. The handheld phone 2 contains the signed trustworthiness certificate 6 that contains its participant public key 7 and also the trustworthiness level TL assigned to the handheld phone 2.

A certificate authority public key 17 corresponding to the certificate authority private key can be deemed to be publicly available, such that any entity can use it to check the trustworthiness certificate signature 9 and therewith the affiliation of the handheld phone 2 and the trustworthiness certificate 6. Hence the trustworthiness level TL can be determined. Otherwise, the certificate authority might also provide the first communication partner 1 with this certificate authority public key 17, or it can be downloaded from somewhere, e.g. a data network.

At the time of production or personalization, a smartcard module 5 of the smartcard 1 is loaded with a first-partner certificate 10 $Cert^{SC}{}_{CA}$ designating a first-partner public key 1 $K_{SC}$ for the smartcard 1 and a first-partner certificate signature 12. An associated first-partner private key 13 $K^{-1}{}_{SC}$ is also loaded into the smartcard trustworthiness module 5, along with a collection 15 of three sample certificates $C_1$, $C_2$, $C_3$ of various certification authorities $CA_1$, $CA_2$, $CA_3$. Three sample certificates have been chosen for sake of exemplarity only. The collection 15 of sample certificates should generally be sufficiently large so that the trustworthiness certificate 6 $Cert^{ME}{}_{CA}$ presented by an arbitrary handheld phone 2 can be verified with very high probability. Here, a first sample certificate $C_1$ of the sample certificates $C_1$, $C_2$, $C_3$ contains the certificate authority public key 17 needed for authenticating or verifying the trustworthiness certificate signature 9.

When the smartcard 1 is now placed into the handheld phone 2, the trustworthiness level TL of the handheld phone 2 can be established as follows:

The smartcard 1 generates a random number $R_1$ and transmits it to the phone trustworthiness module 4 of the handheld phone 2. This is also called a challenge step, which is supposed to effect a response by the handheld phone 2.

The phone trustworthiness module 4 of the handheld phone 2 signs the random number $R_1$ with its participant private key 8 $K^{-1}{}_{ME}$, and returns the signature $Sign(R_1)$ for the random number $R_1$ together with its trustworthiness certificate 6 $Cert^{ME}{}_{CA}$ to the smartcard 1.

The smartcard 1 searches through its collection 15 of certificates $C_1$, $C_2$, $C_3$ to find the first sample certificate $C_1$ for the certificate authority CA, and verifies the trustworthiness certificate signature 9 on the received trustworthiness certificate 6 $Cert^{ME}{}_{CA}$. Concerning the collection 15 of certificates $C_1$, $C_2$, $C_3$, it is possible to preload a preselection of such certificates on the smartcard 1 to cover the most popular certificate authorities CA. Whenever the trustworthiness certificate signature 9 does not have its equivalent certificate authority public key 17 and the thereto belonging certificate in the smartcard 1, the missing certificate can be loaded from a source which provides this certificate, e.g. some network. It is usual that certificates are arranged in form of chains which means that for trusting a certificate its signature is to be tested wherefor a public key, embedded in another certificate is used, which other certificate is again signed, which signature is again to be checked, a.s.o. until one arrives at a definitely to be trusted certification authority, e.g. oneself. Also several of such certificate chains can exist.

If the trustworthiness certificate signature 9 is correct, the smartcard 1 then extracts the participant public key 7 $K_{ME}$ from the trustworthiness certificate 6 $Cert^{ME}{}_{CA}$ and verifies therewith the random-number signature $Sign(R_1)$. The smartcard 1 aborts the process if either signature verification fails and establishes a trustworthiness level TL of 0.

If the verification succeeds, the smartcard 1 examines the trustworthiness field 14 in the trustworthiness certificate $Cert^{ME}{}_{CA}$ and constructs a trustworthiness level token (TLT) which indicates that the handheld phone 2 which is hosting the smartcard 1 has been authenticated by the smartcard 1 to the trustworthiness level TL.

The smartcard 1 has hence verified that the received trustworthiness certificate $Cert^{CA}{}_{ME}$ is valid in the sense that it was produced by an entity with the authority to assign the trustworthiness certificate $Cert^{ME}{}_{CA}$ and also that the trustworthiness certificate $Cert^{ME}{}_{CA}$ is not being replayed or imitated.

If the trustworthiness certificate 6 $Cert^{ME}{}_{CA}$ fails verification then the handheld phone 2 is considered untrusted, i.e. it is assigned a trustworthiness level TL of 0. In this case, the smartcard 1 may choose to terminate the session, or continue the session with the restriction that only applications which are allowed to run on the non-secure communication connection can be executed.

The smartcard 1 creates the trustworthiness level token TLT which represents the established trustworthiness level TL and forwards it to the second communication partner 3, which is a third party, to demonstrate to this third party the trustworthiness level TL of the handheld phone 2.

The smartcard 1 can communicate the established trustworthiness level TL to the second communication partner 3 by piggy-backing the trustworthiness level information TLT onto a communication message, signing this communication message with the first-partner private key 13 and sending it to the second communication partner 3 where the signature can be tested by using the first-partner public key 11.

Alternatively, as e.g. used in GSM, the two communication partners 1, 3 can already trust each other before establishing the trustworthiness level TL of the participant 2 in that they both have a common private key, which could be the first-partner private key 13. This can be realized in that the smartcard 1 is issued by an authority which has set up the first-partner private key 13 in the server 3 and in that the smartcard is by this authority, which then of course is to be trusted, preloaded with the first-partner private key 13.

An application which uses contact to the back-end server 3 and which runs on the handheld phone 2 is selected for execution. The back-end server 3 and the smartcard 1 are authenticated to each other using a protocol that does not depend on the trustworthiness of the handheld phone 2. For example, if the handheld phone 2 is a GSM handset and the smart-card 1 is a SIM, then the back-end server 3 and the smartcard 1 are authenticated using the standard GSM authentication functions. Alternatively the authentication functions of WTLS can be used.

The smartcard 1 communicates the trustworthiness level TL of the handheld phone 2 to the back-end server 3 by appending the trustworthiness level token TLT to the application packets of the application that are sent from the smartcard 1 to the back-end server 3. The trustworthiness level token TLT may be appended to each application packet or be transmitted according to another strategy, depending on a determined token communication policy, e.g. once per a fixed time period or a fixed number of times per session etc.

When the back-end server 3 has received the trustworthiness level token TLT of the handheld phone 2 via the smartcard 1, it need not verify the trustworthiness level TL of the handheld phone 2 with the handheld phone 2 itself, because this has already been done by the trusted smartcard 1. For the application A the back-end server 3 consults a trustworthiness policy 16 pol(A), e.g. in form of a stored table, which describes what restrictions are placed on the application A relative to the trustworthiness level TL designated by the trustworthiness level token TLT. The back-end server 3 adjusts it actions and responses in the application A accordingly. With other words, the back-end server 3 consults the trustworthiness policy 16 pol(A) for the application A, and modifies or chooses its communication behavior according to the trustworthiness level TL given in the trustworthiness level token TLT.

The smartcard 1 is then instructed by the user to establish a secure and authenticated session with the back-end server 3 so as to run the application A. The back-end server 3 and the smartcard 1 run WTLS using the option where both the client, i.e. the smartcard 1, and the back-end server 3 are authenticated using certificate exchange. At this point the trustworthiness between the back-end server 3 and smartcard 1 has been established.

When the smartcard 1 is required to send application data D to the back-end server 3, the smartcard 1 appends the trustworthiness level token TLT and sends the pair (D, TLT). Since the channel between the back-end server 3 and the smartcard 1 is authenticated, the back-end server 3 believes that the trustworthiness level TL given in the trustworthiness level token TLT is in fact the trustworthiness level TL of the handheld phone 2 hosting the smartcard 1 for this session.

The trustworthiness level token TLT is a data item which is meaningful to the back-end server 3. It could be identical with the integer value of the trustworthiness level TL, in which case the back-end server 3 shall examine the policy 16 that describes its actions or communication behavior for that trustworthiness level TL. Alternatively, the trustworthiness level token TLT could directly denote the intended trustworthiness level TL according to some relevant trustworthiness metric e.g. monetary amount. Then, no policy 16 is needed.

This example also makes the authentication step between the smartcard 1 and the back-end server 3 explicit, but this need not always be the case. If the handheld phone 2 is a GSM handset, then the smartcard 1 may be a SIM which is authenticated at the time of insertion into the handset 2 using the standard GSM authentication algorithms. The base station of the SIM could forward this authentication information to the back-end server 3, and thus eliminate the need for the establishment of WTLS session between the back-end server 3 and the SIM.

Another example is when the participant 2 does simply have stored the participant private key 8 and has no trustworthiness certificate 6. Then, the smartcard 1 can know either the participant private key 8 or the corresponding participant public key 7 and perform the above described challenge-response test to find out whether the handheld phone 2 knows the participant private key 8. If this is the case, then a corresponding trustworthiness level TL can be assigned. Different trustworthiness levels TL can correspond to different participant private keys 8.

In the above description, the untrusted party is a phone handset. It is to be noted that the general untrusted device is simply any mobile equipment, of which a mobile handset is an example.

The invention claimed is:

1. Method of establishing a trustworthiness level (TL) of a participant (2) in a communication connection between a first communication partner (1) and a second communication partner (3) and for adapting communication behaviour to the established trustworthiness level (TL), whereby said participant (2) is equipped with a trustworthiness certificate (6) and a therefrom separated securely stored participant private key (8) and that said first communication partner (1) receives said trustworthiness certificate (6) from said participant (2), wherefrom said trustworthiness level (TL) is derived and established and said first communication partner (1) tests whether said trustworthiness certificate (6) belongs to said participant (2) using said participant private key (8) and that in case said trustworthiness certificate (6) is confirmed by said test to belong to said participant (2), said first communication partner (1) communicates said established trustworthiness level (TL) to said second communication partner (3) and that at least one parameter of said communication behaviour is chosen in dependence of said established trustworthiness level (TL), characterized in that the first communication partner (1) communicates the established trustworthiness level (TL) to the second communication partner (2) by piggybacking a trustworthiness level information (TLT) onto a communication message, signing said communication message with a first-partner private key (13) and sending it to said second communication partner (3).

2. Method according to claim 1, characterized in that the trustworthiness certificate (6) arrives at the first communication partner (1) signed with a signature (9), produced with a certificate authority private key, and that said first communication partner (1) authenticates said signature (9) using a certificate authority public key (17).

3. Method according to claim 2, characterized in that the certificate authority public key (17) is read from a storage of the first communication partner (1).

4. Method according to claim 1, characterized in that the authenticity of the trustworthiness level information (TLT) Of the communication message is testable by the second communication partner (3) by using a first-partner public key (II).

5. Method according to one of claims 1 to 4, characterized in that as one of the parameters of the communication behaviour which is chosen in dependence of the established trustworthiness level (TL), is chosen the amount or number of a valuable asset, e.g. a maximum number of financial transactions and/or a maximum financial value of a financial transaction and/or a maximum number of confidential words.

6. Method according to one of claims 1 to 5, characterized in that the test whether the trustworthiness certificate (6) belongs to the participant (2) is performed in that a test number (R,) is transmitted by the first communication partner (1) to said participant (2) from where said test number (R,) returns signed under use of the participant private key (8) and in that the signature of the returning test number (R,) is verified by using a participant public key (7) which corresponds to said participant private key (8).

7. Method according to claim 6, characterized in that the participant public key (7) is received by the first communication partner (1) as content of the trustworthiness certificate (6).

8. Method according to claim 6 or 7, characterized in that the trustworthiness level (TL) is established in that for each trustworthiness level (TL) a different trustworthiness certificate (6) with a corresponding pair of participant public key (7) and participant private key (8) is used.

9. Method of establishing the trustworthiness level (TL) of a participant (2) in a communication connection between a first communication partner (1) and a second communication partner (3) and for adapting communication behaviour to the established trustworthiness level (TL), whereby said participant (2) is equipped with a securely stored participant private key (8) and that said first communication partner (1) performs an authentication test using said participant private key (8) which also leads to establishing said trustworthiness level (TL) and that in case of a successful authentication said first communication partner (1) communicates the established trustworthiness level (TL) to said second communication partner (3) and that at least one parameter of said communication behaviour is chosen in dependence of said established trustworthiness level (TL), characterized in that the authentication test is performed in that a test number ($R_,$) is transmitted by the first communication partner (1) to the participant (2) from where said test number ($R_,$) returns signed under use of the participant private key (8) and in that the signature of the returning test number ($R_,$) is verified by using a participant public key (7) which corresponds to said participant private key (8).

* * * * *